United States Patent Office 3,335,252
Patented Aug. 8, 1967

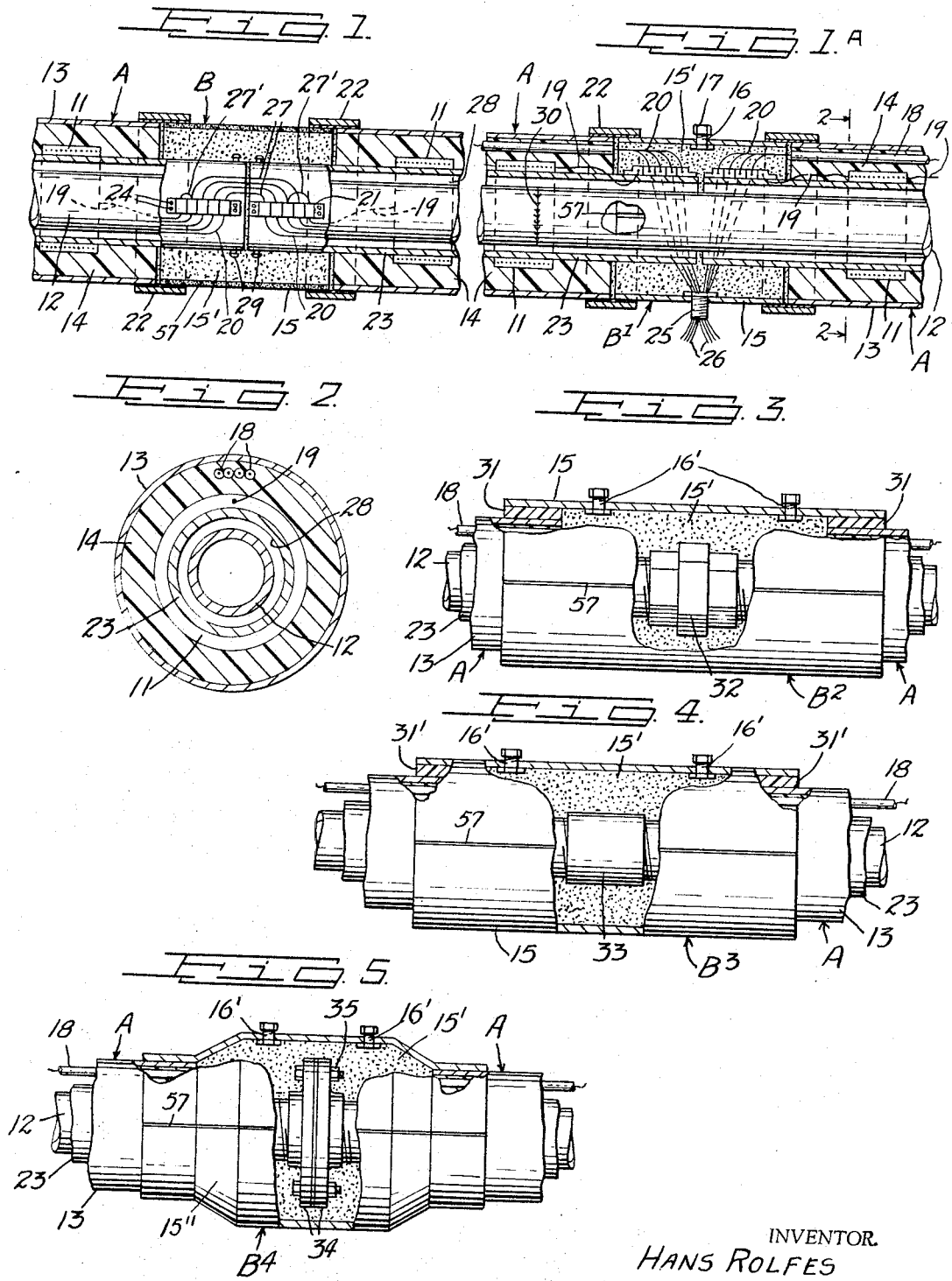

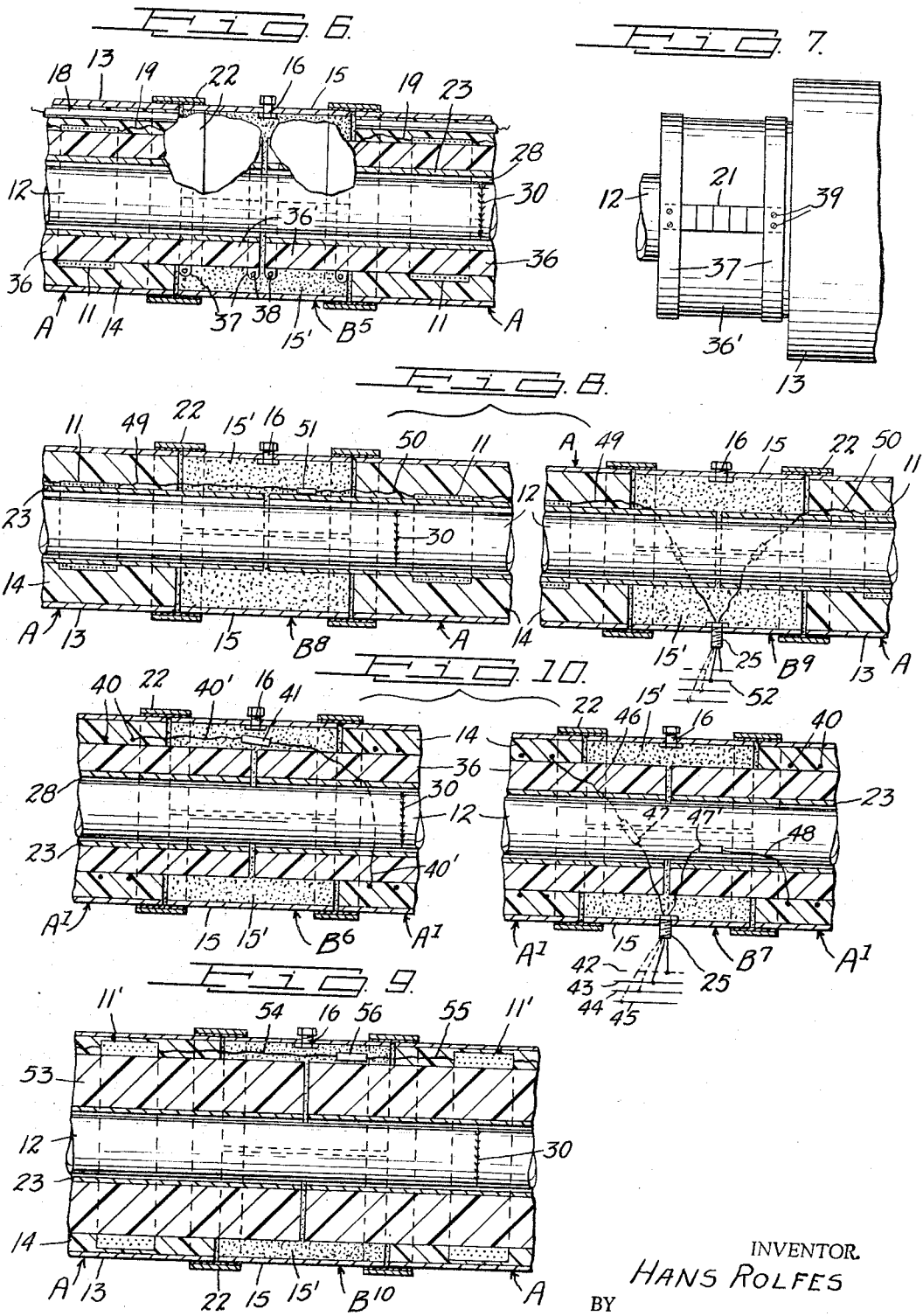

3,335,252
INDUCTION HEATING SYSTEM FOR ELONGATED PIPES
Hans Rolfes, Bronx, N.Y., assignor to Trans Continental Electronics Corp., New York, N.Y., a corporation of New Jersey
Filed Sept. 21, 1964, Ser. No. 397,866
15 Claims. (Cl. 219—10.51)

This invention relates to heating of pipes or fluid mediums passing therethrough in control of temperature thereof. More particularly, the invention deals in an induction heating system employing preformed heating units of predetermined length arranged longitudinally of the pipe and with coupling units at adjacent ends of the heating units facilitating quick and economical uniting of a multiplicity of the heating units in installation thereof longitudinally of a piping. Still more particularly, the invention deals with a system of the character defined, wherein coupling units of the heating system are arranged at couplings provided between the end of pipe lengths and, further, wherein the source of electric supply to the heating units can periodically extend into the system at predetermined spaced coupling units.

The novel features of the invention will be best understood from the following description, when taken together with the accompanying drawing, in which certain embodiments of the invention are disclosed and, in which, the separate parts are designated by suitable reference characters in each of the views and, in which:

FIG. 1 is a diagrammatic sectional view showing one of the coupling units of an induction heating system, with parts of the construction shown in elevation.

FIG. 1A is a view taken at right angles to the showing in FIG. 1, illustrating a coupling unit for admission of the source of electric supply.

FIG. 2 is an enlarged section on the line 2—2 of FIG. 1A.

FIGS. 3, 4 and 5 are side elevations, partly in section, of various modified forms of coupling units which can be employed in conjunction with heating units of the type and kind shown in FIGS. 1; 1A and 2 of the drawing.

FIG. 6 is a view, generally similar to FIG. 1A, showing a modified form of construction.

FIG. 7 is an enlarged diagrammatic plan view of the righthand portion of the heating unit shown in FIG. 1A, omitting the coupling unit and the wiring.

FIG. 8 is a bracketed view showing two different coupling units on modified form of heating units which I employ.

FIG. 9 is a view, similar to the righthand showing of FIG. 8, illustrating another form of heating unit and coupling unit; and FIG. 10 is a view, similar to FIG. 8, showing other forms of heating and coupling units.

In FIGS. 1, 1A and 2, I have shown one adaptation of my invention and, in these figures, A will represent a shop formed or prefabricated heating unit and B, B¹ will represent field installed coupling units.

Each of the heating units include spaced prewound heating coils 11 for heating an electrically conductive pipe 12, preferably made of ferromagnetic material in the heating of fluids passed through the pipe 12. At 13 is shown an outer tubular casing, preferably of waterproof material, which provides a mechanical protection and suitable materials can be employed in the casing such, for example, as extruded polyvinyl chloride. At 14 is shown the insulating material arranged in the tubular casing 13 which is formed in place or, in other words, can be poured at the shop and such materials as polyurethane can be used.

The coupling unit B employs a split sleeve fitting 15, also preferably formed of polyvinyl chloride which is cemented or welded together at the juncture of the split and at 16 is shown a nipple mounted on the sleeve 15, through which foam material 15' can be injected in filling the sleeve 15 in covering the associated parts of the coupling within the sleeve. The nipple 16 can be welded to the sleeve and at 17 is shown a cap for sealing the nipple.

Arranged in each of the units A are conduits or ducts 18 for the electric power supply, four of which are employed, as noted in FIG. 2 of the drawing. The conduits may be made of plastic material. At 19 is shown the electric conductor connecting the respective heating coils 11 spaced longitudinally of each of the units A and extending from end units for attachment to terminal blocks, later described. The wires 20 extending from the conduits 18 are coupled with terminal blocks 21, as diagrammatically illustrated in FIGS. 1 and 1A. The units B, B¹ are fixed to end portions of the units A by rings 22, also preferably formed of polyvinyl chloride, and these rings are either cemented or welded to the split sleeve 15 and the casing 13, so as to provide weatherproof and waterproof couplings. However, no attempt has been made to illustrate the cementing or welding in the drawing.

As part of each of the heating units A is an inner facing or liner pipe or tube 23 made of suitable material and, in the prefabrication of the units A, ends of the tube 23 extend beyond the casing 13 and the insulation 14 to facilitate mounting of the terminal blocks 21 thereon as through the medium of screws or other fasteners 24, as diagrammatically seen in FIG. 1 of the drawing. The pipe 23, when units A are employed for handling temperatures up to approximately 130° F., can be formed of polyvinyl chloride; whereas, when the temperature rises to approximately 250° F., the pipe can be composed of epoxy. In extending to 450° F., an asbestos pipe can be employed and, as and when higher temperatures are required, a ceramic pipe can be employed.

Considering FIG. 1A of the drawing, it will appear that the coupling unit B¹ differs from the unit B in having a nipple, as at 25, through which wiring from a source of supply can enter the system, the wires extending to terminal blocks on adjacent ends of heating units coupled through the medium of the unit B¹, as diagrammatically illustrated. The two groups of four wires each passing through the nipple 25 are diagrammatically illustrated at 26. The coupling units B¹ are provided at predetermined spaced intervals along the pipe 12 as and when it is necessary to service the heating coils of successive units which are coupled together as, for example, at the coupling units B.

Considering FIG. 1 of the drawing, it will appear that jumpers, as at 27, are provided between the wires 20 of adjacent units and at 27' are shown jumpers to connect coil leads or wires 19 to respective power supply terminals, as later described.

It will appear that a spacing, as at 28, is provided between the bore of the pipe 23 and the pipe 12 in order to clear the pipe welds. It will also be noted at 29 that set screws are employed to hold the pipe 23 in spaced relation to the pipe 12 to centralize the pipe 12 within the pipe 23. The welds appearing periodically in juncture of lengths of the pipe 12 are diagrammatically illustrated at 30.

In FIGS. 3, 4 and 5 of the drawing, I have shown modified adaptations in the coupling units employed. In FIG. 3, B² represents an elongated split sleeve having fixed to end portions thereof filler rings 31 engaging the outer casing 13 at ends of each of the heating units A. It is pointed out that the heating units A of this figure, as well as in FIGS. 4 and 5, will be the same as the units shown in FIGS. 1, 1A and, for this reason, no detail showing is made of the electric wire terminal blocks and the wires coupled therewith; but, otherwise, like references will designate like parts of the heating units A.

With the construction shown in FIG. 3, adjacent ends of the pipe 12 are coupled within the coupling B² by a standard union 32; whereas, in FIG. 4, a conventional pipe nipple is employed, as illustrated at 33; whereas, in FIG. 5, pipe flanges 34 are employed which are secured together by spaced bolts 35.

In FIGS. 3, 4 and 5, it will be noted that pairs of nipples 16' are employed, instead of the single nipple 16, shown in FIGS. 1, 1A. The dual nipples are employed to provide a better distribution of the sealing foam material 15' within the respective casings.

The coupling unit B³ in FIG. 4 employs a split casing, having filler rings, as at 31', similar to the rings 31 of FIG. 3. However, in FIG. 5 of the drawing, the coupling unit B⁴ employs a split casing 15" of such cross-sectional contour as to receive the flanges 34 and otherwise would be of a split construction for welding and cementing of the casing halves, as with the structure shown in FIGS. 1, 1A and as also would be employed in the sleeves of the couplings B² and B³ in FIGS. 3 and 4 of the drawing.

In FIGS. 6 and 7 of the drawing, I have shown a slight modification of the structure shown in FIGS. 1, 1A and, in these figures, like references will designate like parts and, instead of arranging the coils 11 directly upon the pipe 23, the coils are arranged upon the outer surface of a sleeve 36 of high temperature insulation, higher than the foam 14 arranged outwardly thereof. The sleeve 36 is arranged directly upon the tube 23 and extends beyond the end of the casing 13 and insulation 14, as seen at 36'. With this construction, the terminal block 21 is arranged upon the extension 36' of the sleeve and is secured thereto by metal straps 37, having their ends secured, as diagrammatically seen at 38 in FIG. 6 of the drawing, the straps being secured to the block 21 by screws or other fastening 39, as indicated in FIG. 7. This mounting is clearly illustrated in FIG. 7 and, in said figure, the wires leading to the block 21 have been omitted, as this wiring would be the same as that shown in FIGS. 1 and 1A. With this construction, the heating units A will be prefabricated and joined by the coupling which, in FIG. 6 of the drawing, is identified as the coupling unit B⁵.

Turning now to FIG. 10, here is shown a slight modification of the structure shown in FIG. 6 and, again, like references will be applied to common structures and, in FIG. 10, 36 represents an insulating sleeve, similar to the sleeve 36 of FIG. 6 and substituted for the coils 11 is a wound induction heating coil 40 and the ends of the coils in adjacent heating unit A¹ project beyond the ends of the casings 13, as seen at 40', and these connections are electrically connected, as seen at 41.

At the left of FIG. 10, the coupling unit is identified by the reference character B⁶ and the associated unit of this system is illustrated at B⁷ at the right of FIG. 10 where the nipple 25 is employed for introduction of electric current from an external power supply, as diagrammatically seen by the four power supply lines 42, 43, 44 and 45. 42 would represent a normal or medium source of supply; whereas, the lines 43, 44 and 45 would be successively higher phases for proper transmission of heat through an extremely long system. In the righthand showing of FIG. 10, 46 would represent the wire extending from the coil 40, with electric connection, as at 47, with the source of supply; whereas, at 48 is shown the wire extending to the next adjacent coil 40 with its electrical connection, as at 47'.

Turning now to the illustration in FIG. 8 of the drawing, here is illustrated a slight modification of the structure shown in FIGS. 1 and 1A, where the terminal blocks are dispensed with and wires from one unit A will extend to the adjacent unit A through a coupling unit B⁸ by direct connection of the wire 49 extending from the coil 11 of one unit and coupled with the wire 50 projecting from the coil 11 of the adjacent unit through an electrical coupling, as at 51, arranged within the confines of the coupling unit B⁸. This unit is otherwise generally of the same structure as that shown in FIG. 1 of the drawing.

At the right of FIG. 8 is a unit B⁹ which differs from the unit B¹ simply in having the ends of the wires 49–50 extending from the coils passed through the nipple 25 for coupling with the series of wires, generally identified by the reference character 52, otherwise similar to the wires 42 to 45, inclusive, in FIG. 10 of the drawing.

Now turning to the structure shown in FIG. 9 of the drawing, in this showing, the source of supply end of the system is omitted, as it would be otherwise identical with the showing at the right of FIG. 8 of the drawing. This construction is primarily adapted for use where high temperatures are employed in the heating coils of the heating units, the coils in FIG. 9 being shown at 11' and are arranged outwardly of a considerably thicker sleeve of high temperature insulation, as indicated at 53, in other words, thicker than the sleeve 36 of FIG. 6 and, in FIG. 9, the wires 54 and 55 extending from the heating units A are electrically coupled, as seen at 56, within the coupling unit B¹⁰, which unit is similar to the unit B⁶ and will empoly at spaced intervals a unit, similar to the unit B⁷ of FIG. 10 for supply of power from a power source and, for this reason, the duplicate showing is not deemed to be necessary.

With the present construction, heating units can also be prefabricated and mounted on the pipe or other member to be heated and coupling units employed in joining the heating units along the pipe which can be welded at odd intervals, keeping in mind that the heating units are capable of being slipped over the pipe ends. By providing coupling units of the type and kind under consideration, the same can be attached and detached at will for repair or other purposes by simply breaking the seals or forcibly removing the retainer rings at the several stations defined by the coupling units.

With systems as shown in FIG. 9, induction heating of circulating pipe is at high temperatures. To dissipate the generated heat in the induction heating coils more effectively, the coils are placed adjacent the casing 13 to take advantage of the ambient air or soil temperature.

It will be apparent that the different circuits of the wires or conduits 18 are picked up at spaced couplings by means of the jumpers 27', as illustrated in FIG. 1, to care for heating the coils in long lengths of pipes.

With the structure shown in FIGS. 1 to 6, inclusive, the conduits 18 are contained within the system and the initial coupling with an external source of supply at widely spaced intervals will be as at 25, 26 FIG. 1A. With illustrations, as for example in FIGS. 8 to 10, inclusive, the source of supply is external of the system and the heating coils will be coupled with the source of supply, as at 42–45 FIG. 10 of the drawing, or generally shown at 52 in FIG. 8 of the drawing.

In the several illustrations, the insulation, as at 15', within the coupling units and particularly that part inserted into the sleeves of the coupling unit is stippled to distinguish this field inserted insulation from that employed in the pre-formed heating units.

The pipes of the various systems will be modified in characteristics in handling different temperatures; for example, polyvinylchloride can be used with temperatures up to 130° F.; whereas, when temperatures rise to approximately 250° F., the pipe can be composed of epoxy and, when the temperature extends to 450° F., asbestos pipes can be employed and, with still higher temperatures, ceramic pipes will be preferred.

The cement or weld at the split in the sleeves is diagrammaticaly indicated at 57 in FIGS. 1A, 3, 4 and 5. However, in FIG. 1 of the drawing, the cement or weld has been sectionally stippled for purposes of description.

Having fully described my invention, what I claim as new and desire to secure by Letters Patent is:

1. In an induction heating system for heating an elongated pipe wherein said pipe is constructed of predetermined lengths butt welded together and the pipe includes widely spaced detachable couplings, said system comprising coupled prefabricated insulated electric heating units arranged longitudinally of and spaced from the pipe, each unit comprising an inner liner tube, and outer casing, electric heating means and insulation between said liner tube and casing, said heating means including a source of electric supply, means maintaining spacing of the liner tube and pipe, said liner tube having projecting ends extending beyond ends of the casing at each end of the unit, projecting ends of the liner tubes of adjacent units being arranged in spaced relation to each other at primary coupling units including insulation arranged within split sleeves, means at said coupling units for joining the circuits of coupled units, other means at predetermined secondary coupling units for introducing different power phases of current supply, and the split sleeves of coupling units arranged at the detachable pipe couplings being of different characteristics than those at said primary and secondary coupling units.

2. A system as defined in claim 1, wherein the electric heating means comprises electrically coupled heating coils spaced longitudinally on said liner tube.

3. A system as defined in claim 1, wherein the insulation of said units comprises inner and outer insulations of different characteristics, and said heating means being arranged on said inner insulation.

4. A system as defined in claim 1, wherein the insulation of said units comprises inner and outer insulations of different characteristics, and said heating means comprising electrically coupled heating coils spaced longitudinally on said inner insulation.

5. A system as defined in claim 1, wherein the insulation of said units comprises inner and outer insulations of different characteristics, and said heating means comprising a wound electric heating coil arranged on said inner insulation.

6. A system as defined in claim 1, wherein the source of electric supply comprises conduits arranged in each of said heating units.

7. A system as defined in claim 1 wherein means is employed effecting a seal between said sleeves and the casings of adjacent units.

8. A system as defined in claim 1, wherein the insulation of said units comprises inner and outer insulations of different characteristics, said inner insulation extending the full length of said liner sleeve, and the outer insulation extending the full length of said casing.

9. A system as defined in claim 1, wherein the source of electric supply comprises conduits arranged in each of said heating units, and means for joining the conduits at said primary coupling units.

10. A heating unit for induction heating systems of the character defined, said unit comprising an inner elongated liner tube, an outer elongated casing, electric heating means and insulation arranged longitudinally between said liner tube and casing, the casing being mounted directly upon the insulation and the insulation upon said liner tube, said liner tube having projecting ends extending beyond ends of the casing at each end of the casing, and means for maintaining a spacing between the liner tube and a pipe on which the unit is arranged.

11. A unit as defined in claim 10, wherein the insulation of the unit comprises inner and outer insulations of different characteristics, and said inner insulation extending onto the projecting ends of said liner tube.

12. A unit as defined in claim 11, wherein said electric heating means is arranged upon said inner insulation.

13. A unit as defined in claim 12, wherein said heating means comprises electrically coupled heating coils spaced longitudinally of said inner insulation, and a source of electric supply comprising conduits arranged longitudinally of the unit.

14. A unit as defined in claim 12, wherein said electric heating means comprises a wound electric heating coil arranged on said inner insulation.

15. A unit as defined in claim 10, wherein said electric heating means comprises electrically coupled heating coils spaced longitudinally of said liner tube, and a source of electric supply comprising conduits arranged longitudinally of the unit.

References Cited

UNITED STATES PATENTS

| | | | |
|---|---|---|---|
| 2,178,721 | 11/1939 | Daniels | 219—10.51 X |
| 2,513,779 | 7/1950 | Bailey | 219—10.51 |
| 2,729,731 | 1/1956 | Kleinpeter | 219—10.51 |
| 2,888,541 | 5/1959 | Netzer | 219—10.79 X |
| 3,182,170 | 5/1965 | Rolfes | 219—10.79 |
| 3,265,851 | 8/1966 | Schroeder | 219—10.49 X |

RICHARD M. WOOD, *Primary Examiner.*

L. H. BENDER, *Assistant Examiner.*